United States Patent [19]

Sadler

[11] Patent Number: 5,416,537
[45] Date of Patent: May 16, 1995

[54] MAGNETIC MEANS FOR SECURING AUXILIARY LENSES TO EYEGLASSES

[76] Inventor: Frank Sadler, c/o 2371 Chauvin Dr. B, Lexington, Ky. 40502

[21] Appl. No.: 215,615

[22] Filed: Mar. 22, 1994

[51] Int. Cl.⁶ .................................................. G02C 7/08
[52] U.S. Cl. .......................................... 351/57; 351/47
[58] Field of Search ...................... 351/41, 47, 57, 58, 351/92, 106, 158; 2/441, 443

[56] References Cited

U.S. PATENT DOCUMENTS

| | | | |
|---|---|---|---|
| 2,737,847 | 3/1956 | Tesauro | 351/57 |
| 3,531,118 | 9/1970 | LeBlanc et al. | 351/48 |
| 4,070,103 | 1/1978 | Meeker | 351/57 |
| 4,196,981 | 4/1980 | Waldrop | 35/57 |
| 5,181,051 | 1/1993 | Townsend et al. | 351/158 |
| 5,243,366 | 9/1993 | Blevins | 351/57 |

Primary Examiner—William L. Sikes
Assistant Examiner—Huy Mai
Attorney, Agent, or Firm—Staas & Halsey

[57] ABSTRACT

An eyeglass device is provided which includes frames adapted for fitting on and being supported by a human wearer's head. Primary lenses are set within the frames and have an external shape. The eyeglass device also has auxiliary lenses which have an external shape which generally corresponds to the external shape of the primary lenses. First magnetic members are attached to the frames, and second magnetic members are attached to the auxiliary lenses in positions which correspond to the positions of the first magnetic members in the frames. The second magnetic members are arranged for engagement with the first magnetic members to thereby secure the auxiliary lenses to the eyeglasses.

5 Claims, 3 Drawing Sheets

MAGNETIC MEANS FOR SECURING AUXILIARY LENSES TO EYEGLASSES

BACKGROUND OF THE INVENTION

1. Field of the Invention

The present invention relates in general to eyeglasses and auxiliary lenses adapted for attaching to eyeglasses. More particularly, the present invention relates to the means in which auxiliary lenses are attached to eyeglasses.

2. Description of the Related Art

In the past various means have been used to secure auxiliary lenses to eyeglass. Most notably, clips have been used, which clips are permanently attached to the auxiliary lenses. The clips fit around the frames of the eyeglasses to clip the auxiliary lenses to the eyeglasses. However, the clips, and especially the mechanism which opens the clips, are unattractive.

Other means for securing auxiliary lenses to eyeglasses have also been proposed. However, these other means have characteristic problems which make them less than optimal. According to some means for attaching auxiliary lenses to frames, the bond achieved leaves room for improvement. Moreover, some means which have been suggested allow gaps between the auxiliary lenses and the frames. It is very important that these gaps be minimized, especially in areas where sunlight could come between the auxiliary lens and the eyeglasses.

SUMMARY OF THE INVENTION

It is therefore an object of the present invention to provide an eyeglass device with means for securing auxiliary lenses which does not employ clips.

It is another object of the present invention to provide means for securing auxiliary lenses to eyeglasses which provides a strong bond between the two.

It is a further object of the present invention to provide means for securing auxiliary lenses to eyeglasses which minimizes gaps between the frames and the auxiliary lenses, especially in areas which sun rays would enter.

It is a still further object of the present invention to provide means for securing auxiliary lenses to eyeglasses which is not readily visible when one wears the eyeglasses without the auxiliary lenses attached thereto.

According to the present invention, an eyeglass device is provided. The eyeglass device has frames adapted for fitting on and being supported by a human wearer's head. Primary lenses are set within the frames and have an external shape. The eyeglass device also has auxiliary lenses which have an external shape which generally corresponds with the external shape of the primary lenses. First magnetic members are attached to the frames. Second magnetic members are attached to the auxiliary lenses in positions which correspond to the positions of the first magnetic members. The second magnetic members are arranged for engagement with the first magnetic members to thereby secure the auxiliary lenses to the eyeglasses.

The above and other objects, features and advantages of the present invention will become more apparent from a study of the following description and appended claims, with reference to the attached drawings showing some preferred embodiments of the invention.

BRIEF DESCRIPTION OF THE DRAWINGS

Hereinafter, a preferred embodiment of the invention will be described with reference to the accompanying drawings, in which.

DESCRIPTION OF THE PREFERRED EMBODIMENT

Figure 1:
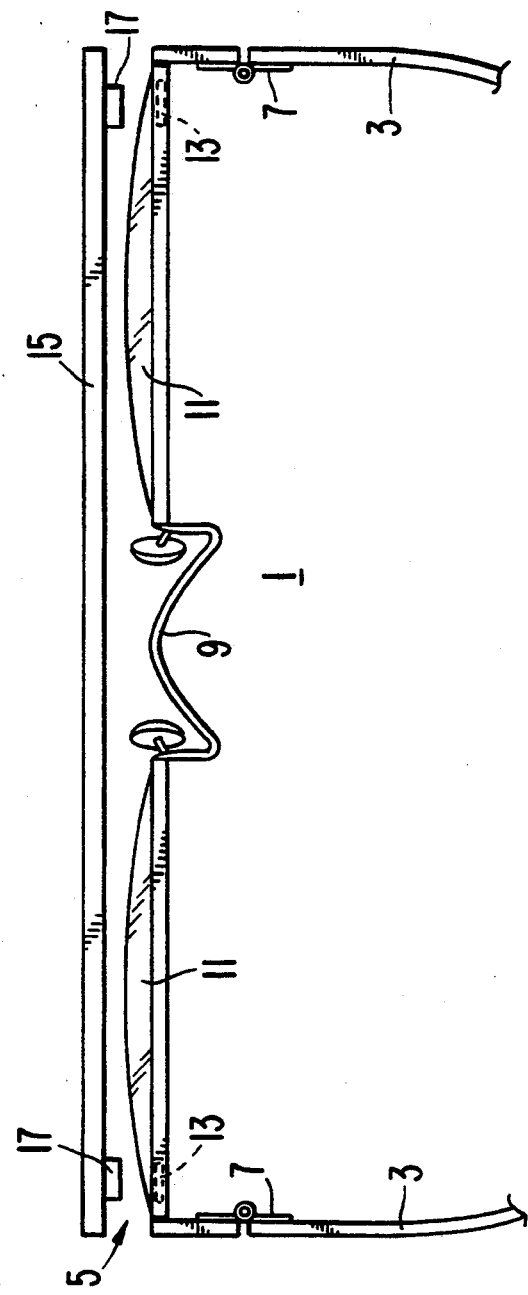
FIG. 1 is a top view of an eyeglass device according to the present invention.

Preferred embodiments of the present invention will now be described in detail with reference to the appended drawings, in which like elements are denoted by like reference numerals.

Figure 2:
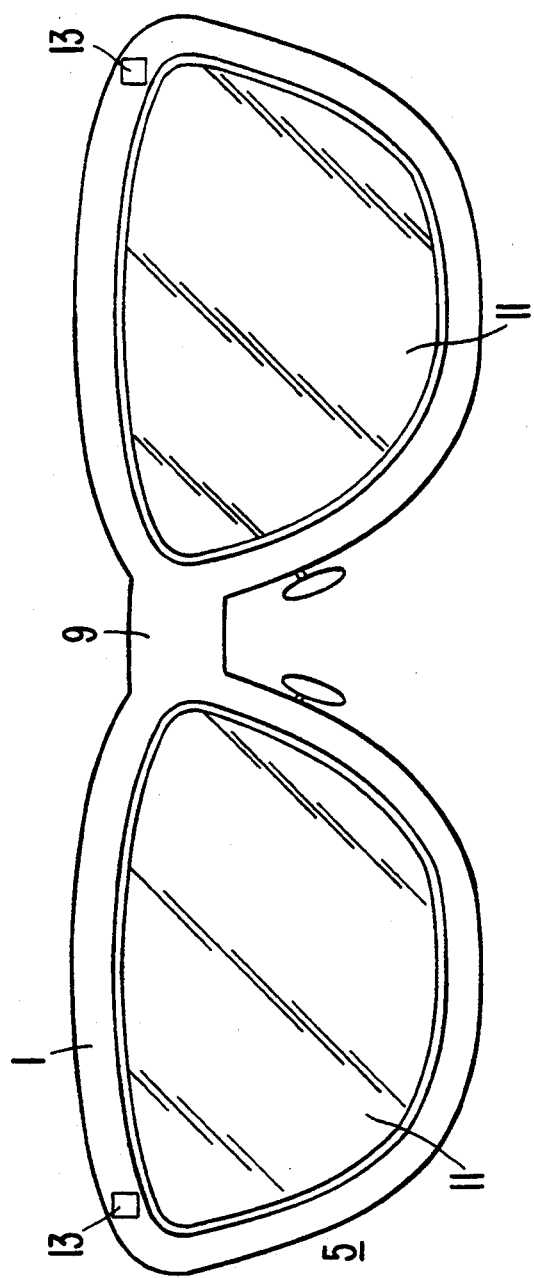
FIG. 2 is a front view of eyeglass frames, primary lenses and associated elements according to the present invention.

FIG. 1 is a top view of an eyeglass device according to the present invention. FIG. 2 is a front view of frames, primary lenses and associated elements according to the present invention. As can be seen in FIGS. 1 and 2, the eyeglass device has frames 1 made of plastic or other conventional material. The frames 1 may include metal support members embedded therein (not shown). The metal support members function to provide added strength to the frames. Frames 1 include stems 3 which are attached to a front portion 5 of the frames 1. The stems 3 fit over a wearer's ears to support the eyeglasses. The stems 3 are attached to the front portion 5 by hinges 7 on either side of the front portion, near the temporal region of the wearer. A bridge 9 is located toward the middle of the front portion 5. The bridge 9 rests on the wearer's nose, also to support the eyeglasses.

On either side of the bridge 9, within the frames 1, are primary lenses 11. Primary lenses 11 may be made of clear or slightly tinted glass or plastic material. One or both of the primary lenses 11 may be ground according to the wearer's visual deficiencies.

The first magnetic members 13 are attached to the frames 1. As can be seen in FIG. 2, the first magnetic members 13 are located at positions which correspond to the temporal region of the wearer. The first magnetic members 13 may be the same color as the frames 1 so as not to be readily apparent. To this end, the first magnetic members 13 may also be recessed below the surface of the frames 1. Moreover, the first magnetic members 13 may have a thin covering of frame material thereover to be totally hidden. The first magnetic members 13 are made of a magnetic material or a ferromagnetic material.

Figure 3:
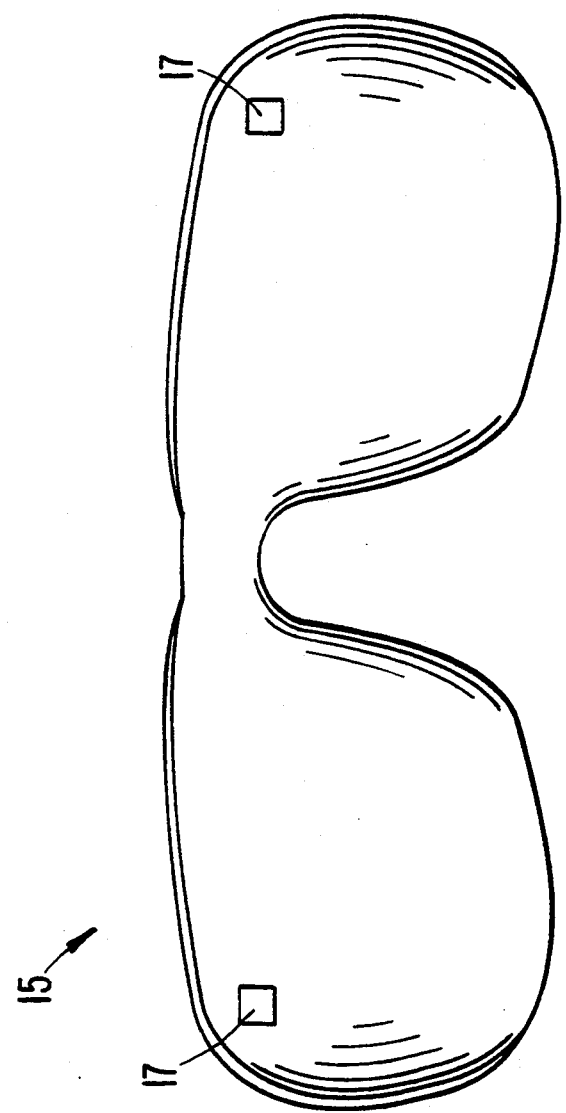
FIG. 3 is a rear view of one embodiment of auxiliary lenses and associated elements according to the present invention.

FIG. 3 is a rear view of auxiliary lenses 15 and associated elements. The auxiliary lenses 15 may be made of plastic or other conventional material. One use for the auxiliary lenses 15 is to provide protection to the wearer from sunlight and other vision-damaging elements. Therefore, the auxiliary lenses 15 may be tinted with a tint which is darker than the tint of the primary lenses 11, and may also include a material therein or a coating thereon to filter ultraviolet light or other specific wavelengths of light.

The auxiliary lenses 15 shown in FIG. 3 are one-piece lenses. That is, the auxiliary lenses cover both of the two primary lenses 11. Alternatively, the auxiliary lenses 15 may be two separate pieces, one to cover each of the primary lenses 11. In either case, the external shape of the auxiliary lenses 15 generally corresponds with the external shape of the primary lenses 11.

As can be seen in FIG. 1, second magnetic members 17 are attached to the auxiliary lenses 15. The second magnetic members 17 are attached to the auxiliary lenses 15 in positions which correspond to the positions of the first magnetic members 13. This allows the second magnetic members 17 to engage the first magnetic members 13 and thereby secure the auxiliary lenses 15 to the frames 1. If the first magnetic members 13 are attached at positions which correspond to the temporal region of the wearer, so too would be the second magnetic members 17. In this case, the auxiliary lenses 15 would be supported from the top. Thus, a more secure bond is achieved. Moreover, because the fit would presumably be tighter between the top of the auxiliary lenses 15 and the top of the frames 1, less sunlight would be allowed between the auxiliary lenses 15 and the primary lenses 11.

The second magnetic members 17 may be made of a permanent magnetic material or a ferromagnetic material. At least one of the first and second magnetic members must be made of a permanent magnetic material in order for a magnetic attraction to exist. Preferably, both the first and second magnetic members are made of a permanent magnetic material. Again, this ensures a more secure bond between the auxiliary lenses 15 and the frames 1.

The above-detailed description with reference to the illustrations is considered to be illustrative and not restrictive in character. Many modifications and variations on the embodiments described may be made. For example, the auxiliary lenses 15 may also be used for magnification of vision. In this case, the auxiliary lenses 15 would be fashioned in the same manner as a magnifying glass and fit onto the primary lenses 11, which may or may not be prescription lenses. The auxiliary lenses 15 would then enlarge small or intricate details to make them more readily observable, so as to reduce the strain on the eyesight of the wearer. The auxiliary lenses 15 may also have decorations thereon to be viewed by observers of the wearer, to enhance the appearance of the lenses or for amusement purposes.

It is to be understood that only the preferred embodiments have been shown, and that modifications thereof would be readily apparent to one skilled in the art. Therefore, the true scope and spirit of the invention resides in the appended claims and their legal equivalents, rather than by the given examples.

What is claimed is:

1. An eyeglass device, comprising:
   primary lenses having external circumferential dimensions and shape;
   frames adapted for fitting on a human wearer's head, the frames having retaining means for retaining the primary lenses, the retaining means having internal circumferential dimensions and shape which are substantially equal to the external circumferential dimensions and shape of the primary lenses, the frames having temporal portions at positions which correspond with temporal regions of the wearer, the temporal portions of the frames defining a portion of the frames external to the retaining means;
   auxiliary lenses having temporal portions at positions which correspond with the positions of the temporal portions of the frames;
   first magnetic members attached to the temporal portions of the frames; and
   second magnetic members attached to the temporal portions of the auxiliary lenses for engagement with the first magnetic members.

2. An eyeglass device according to claim 1, wherein both the first and second magnetic members are permanent magnets.

3. An eyeglass device according to claim 1, wherein the first magnetic members are embedded in the frames.

4. An eyeglass device according to claim 3, wherein the first magnetic members have an upper surface which is level with the frames.

5. An eyeglass device according to claim 1, wherein the auxiliary lenses have a tint which is darker than a tint of the primary lenses.

* * * * *